United States Patent [19]
Bradley et al.

[11] Patent Number: 6,120,448
[45] Date of Patent: Sep. 19, 2000

[54] DIAGNOSTIC MEDICAL ULTRASONIC IMAGING METHOD AND SYSTEM FOR SELECTIVELY PROCESSING HARMONIC AND FUNDAMENTAL IMAGE INFORMATION

[75] Inventors: Charles E. Bradley, Burlingame; Samuel H. Maslak, Woodside, both of Calif.

[73] Assignee: Acuson Corporation, Mountain View, Calif.

[21] Appl. No.: 09/255,072

[22] Filed: Feb. 22, 1999

[51] Int. Cl.$^7$ ........................................... A61B 8/00
[52] U.S. Cl. .............................................. 600/443
[58] Field of Search ................... 600/437, 443, 600/447, 458

[56] References Cited

U.S. PATENT DOCUMENTS

| | | | |
|---|---|---|---|
| 5,526,816 | 6/1996 | Arditi | 600/458 |
| 5,632,277 | 5/1997 | Chapman. | |
| 5,667,373 | 9/1997 | Wright et al.. | |
| 5,685,308 | 11/1997 | Wright et al.. | |
| 5,740,128 | 4/1998 | Hossack et al.. | |
| 5,902,243 | 5/1999 | Holley et al. | 600/447 |
| 5,951,478 | 9/1999 | Hwang et al. | 600/443 |
| 6,010,456 | 1/2000 | Rhyne | 600/447 |

*Primary Examiner*—Francis J. Jaworski
*Attorney, Agent, or Firm*—Brinks Hofer Gilson & Lione

[57] ABSTRACT

A diagnostic medical ultrasonic imaging method and system form first and second signals as a function of the Nth power of the absolute value of first and second ultrasound receive signals. These receive signals are associated with respective first and second transmit pulses that differ in phase and are both associated with overlapping or nearby regions of a subject. A combined signal is formed as a function of the difference between the first and second signals. The low pass component of the absolute value of this combined signal is then applied to an image processor. This low pass component, depending upon the value of N, can correspond to the second harmonic component of the combined receive signals, to the product of the fundamental and second harmonic components of the combined receive signals, and other combinations of fundamental and harmonic components.

26 Claims, 4 Drawing Sheets

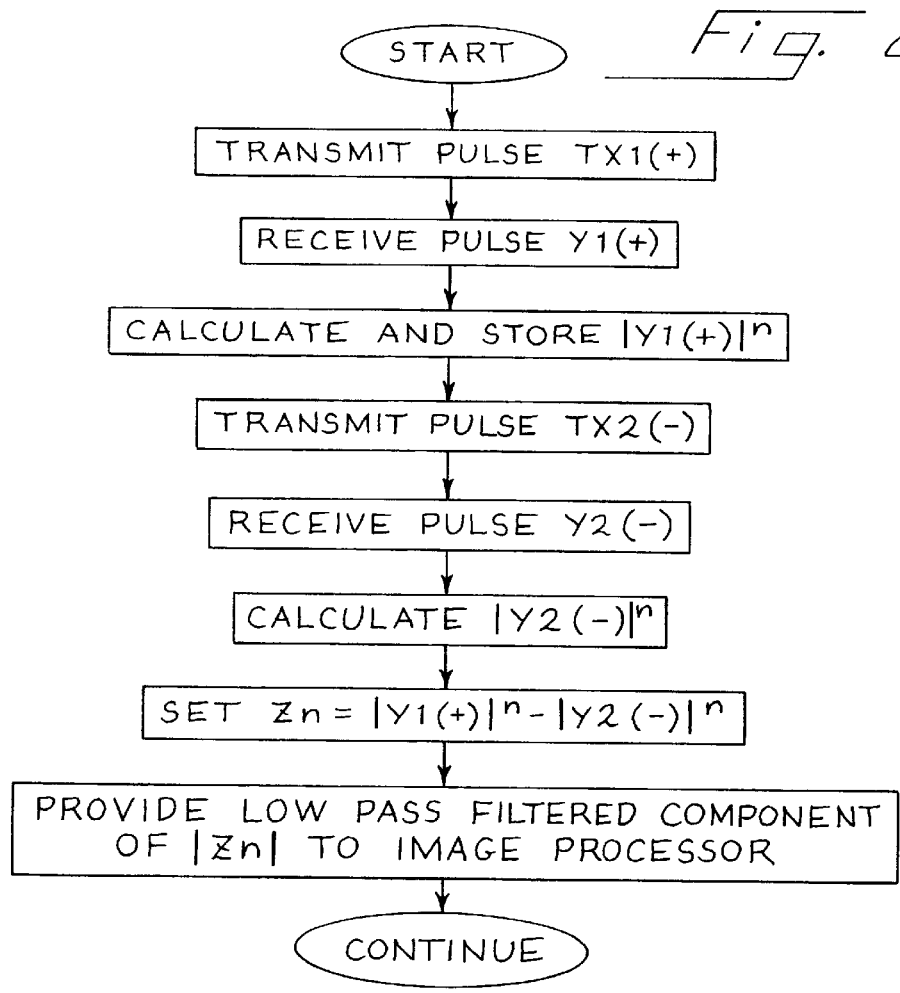
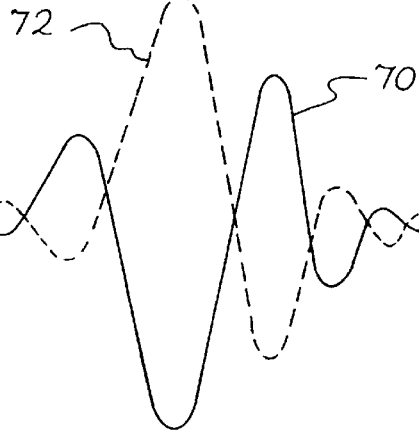

DIAGNOSTIC MEDICAL ULTRASONIC IMAGING METHOD AND SYSTEM FOR SELECTIVELY PROCESSING HARMONIC AND FUNDAMENTAL IMAGE INFORMATION

BACKGROUND

This invention relates to diagnostic medical ultrasonic imaging, and in particular to improved imaging methods and systems that selectively isolate harmonic image signals and combinations of harmonic and fundamental image signals.

Chapman U.S. Pat. No. 5,632,277 discloses an ultrasound imaging system that employs phase inversion subtraction to enhance the image. In the disclosed system, two transmit ultrasonic pulses that differ in phase by 180° are focused in the same beam direction. Echo signals associated with these pulses are stored and then summed. Linear echoes destructively interfere in this summation due to the 180° phase difference between the two transmitted ultrasonic pulses. At least some nonlinear echoes do not destructively interfere to the same extent, because the phases associated with nonlinear echoes do not generally differ by 180°. In this way, the amplitude of nonlinear echoes (such as second harmonic echoes) can be increased relative to the amplitude of linear echoes (such as fundamental echoes) in the summed signal.

SUMMARY

The present invention is directed to a new ultrasonic imaging system and method that combine the receive signals from multiple transmit beams in novel ways to provide further advantages. This invention is defined by the following claims, and nothing in this section should be taken as a limitation on those claims.

By way of illustration, the preferred embodiments described below combine two component images to form a composite image. The component images are acquired using transmit pulses that are inverted copies of one another, and the resultant frames are combined by the rule:

$$ZN = |Y1|^N - |Y2|^N, \qquad \text{(Eq 1)}$$

where N is the order of the imaging mode, and Y1 and Y2 are the two component frames. The absolute value of ZN is then determined and low-pass-filtered, and the resultant signal is sent through the usual processing path before display.

In the condition where N=1, i.e. the first power is used in Equation 1, the low-pass-filtered magnitude of Z1 is equal to the second harmonic image. Similarly, the image that results from low-pass-filtering the magnitude of Z2 is the product of the fundamental image and the second harmonic image, i.e. a frequency compounded image where the component compounded frames are the fundamental and the second harmonic frames. Higher order imaging modes (Z3, Z4, . . . ) are more complicated combinations of the fundamental and second harmonic images.

BRIEF DESCRIPTION OF THE DRAWINGS

FIG. 2 is a flow chart of a method practiced by the embodiment of FIG. 1.

FIGS. 3, 4, 5, 6 and 7 are graphs of signal waveforms associated with the method of FIG. 2.

DETAILED DESCRIPTION OF THE PRESENTLY PREFERRED EMBODIMENTS

Figure 1:
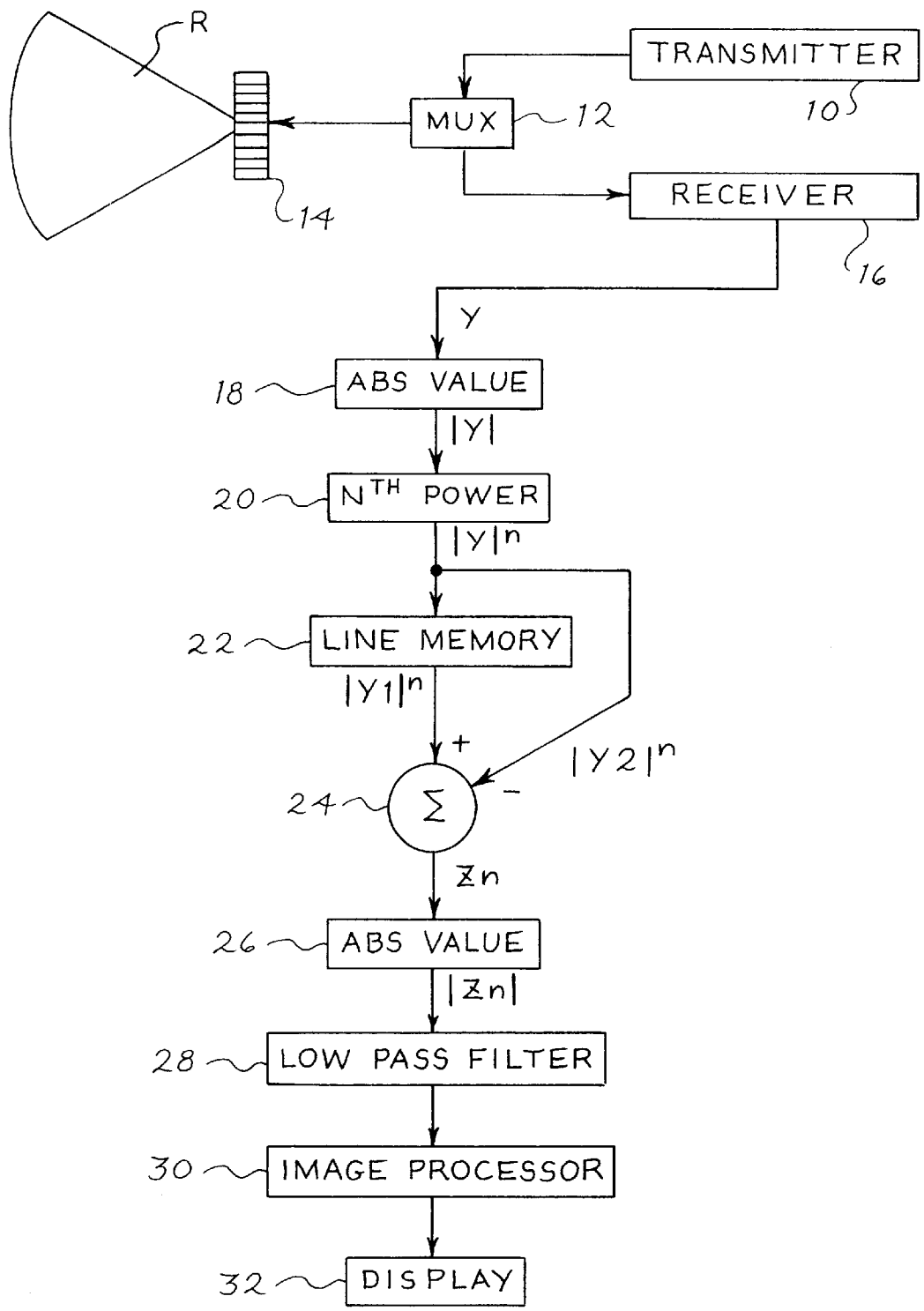
FIG. 1 is a block diagram of a diagnostic medical ultrasonic imaging system that incorporates a first preferred embodiment of this invention.

Turning now to the drawings, FIG. 1 is a block diagram of a diagnostic medical ultrasonic imaging system that includes a transmitter 10 that is coupled to a transducer 14 by a multiplexer 12. The multiplexer 12 also connects transducer 14 with a receiver 16. The transmitter 10 generates ultrasonic transmit pulses that cause the transducer 14 to emit ultrasonic energy along focused beams in a region R being imaged. The region R can for example include tissues of a living subject.

The receiver 16 forms receive signals in response to echo signals incident on the transducer 14. These receive signals are applied to logic blocks 18, 20 which take the absolute value of each receive signal and then raise it to the Nth power, where N is a positive integer.

The output of the logic block 20 is applied both to a line memory 22 and to a summer 24. The line memory 22 stores the modified receive signal of a first line, and then applies this modified receive signal to the summer 24 at an appropriate time to enable this summer 24 to subtract the second modified receive line received from the logic block 20 from the first modified receive line stored in the line memory 22. The output of the summer 24 is applied to a logic block 26 that takes the absolute value of the combined signal ZN. The output of the logic block 26 is applied to a low pass filter 28 that passes the second harmonic component of the magnitude of ZN while blocking higher harmonics. The output of the low pass filter 28 is then applied to a conventional image processor 30 which processes the combined signal for display on a display 32.

A method practiced by the system of FIG. 1 is flowcharted in FIG. 2. In step 40, a transmit pulse TX1(+) is transmitted into the region R. Echoes from the transmit pulse TX1(+) are received by the receiver as a receive signal Y1(+) in step 42, and in step 44 the Nth power of the absolute value of Y1(+) is stored.

In step 46 a second transmit pulse TX2(−) is transmitted into the region R. FIG. 3 shows by way of example two suitable transmit pulses 70, 72, which correspond to TX1(+) and TX2(−), respectively. As shown in FIG. 3, TX1(−) is phase shifted by 180° (one half cycle of the common center transmit frequency of the transmit pulses TX1(+) and TX2(−)).

Figure 4:
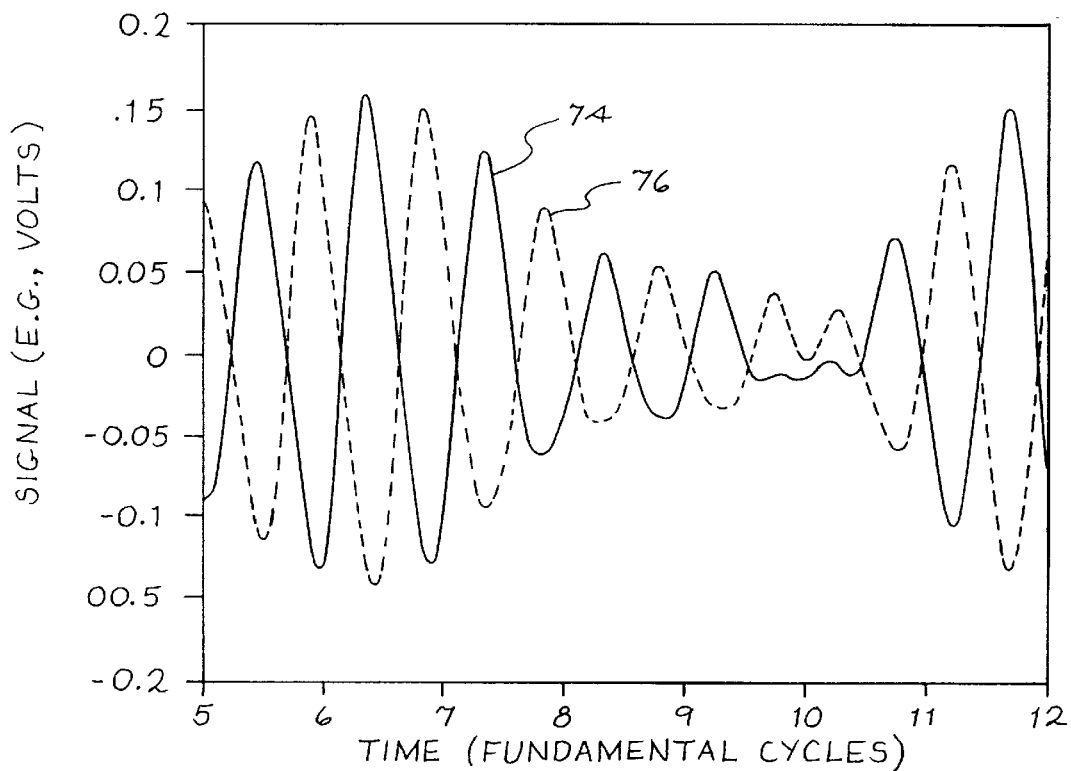

In step 48 a receive signal Y2(−) associated with echoes from the transmit pulse TX2(−) is received. FIG. 4 shows by way of example two curves 74, 76 which correspond to examples of the receive signals Y1(+), Y2(−), respectively. Note that the fundamental components of the receive signals Y1(+), Y2(−) are offset by about 180°.

Figure 5:
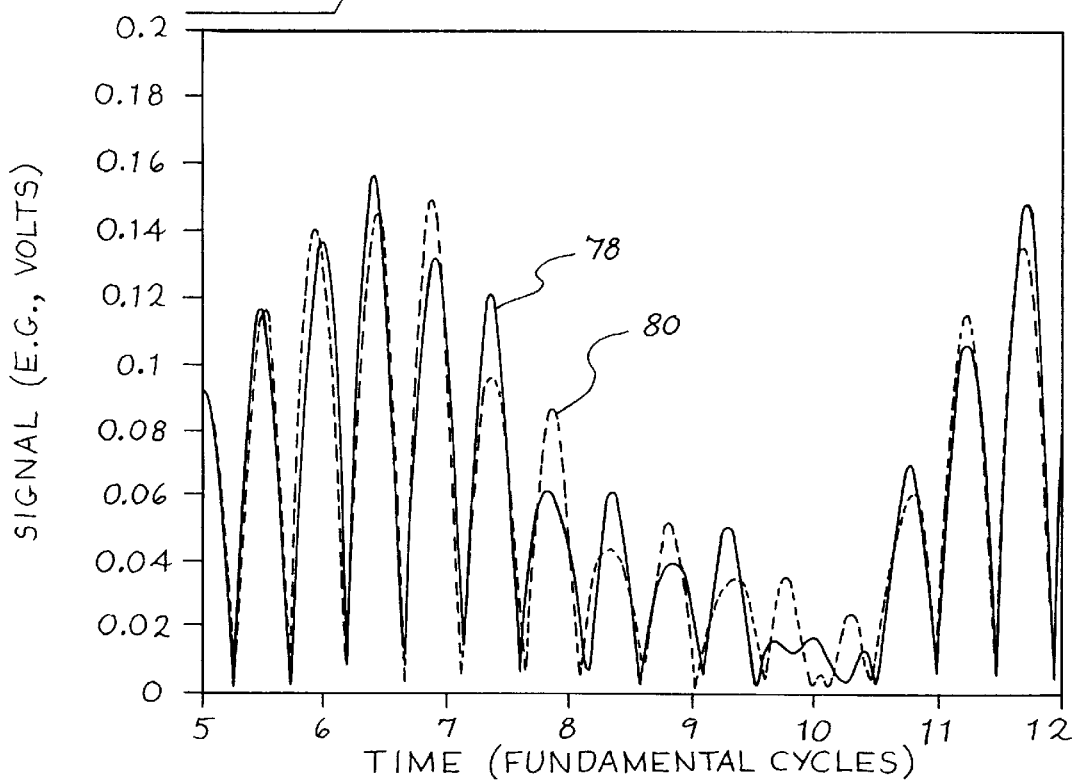

In step 50 the Nth power of the absolute value of Y2(−) is calculated. FIG. 5 shows in curves 78, 80 examples of the first power of the absolute value of Y1(+) and Y2(−), respectively. Note that in this example N=1.

Figure 6:
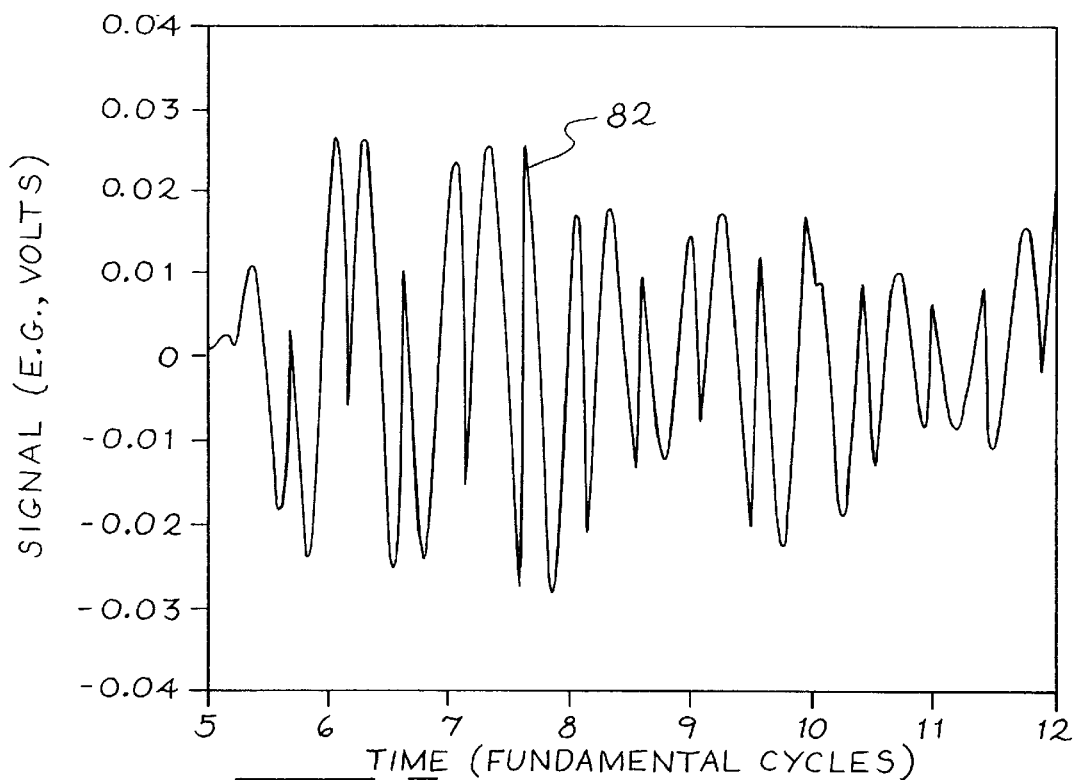

In step 52 ZN is set equal to the difference between the Nth power of the absolute value of Y1(+) and the Nth power of the absolute value of Y2(−). FIG. 6 shows in curve 82 one example of Z1. Note that in curve 82 the fundamental component has been canceled, and only higher frequency components remain, including primarily second harmonic components.

Figure 7:
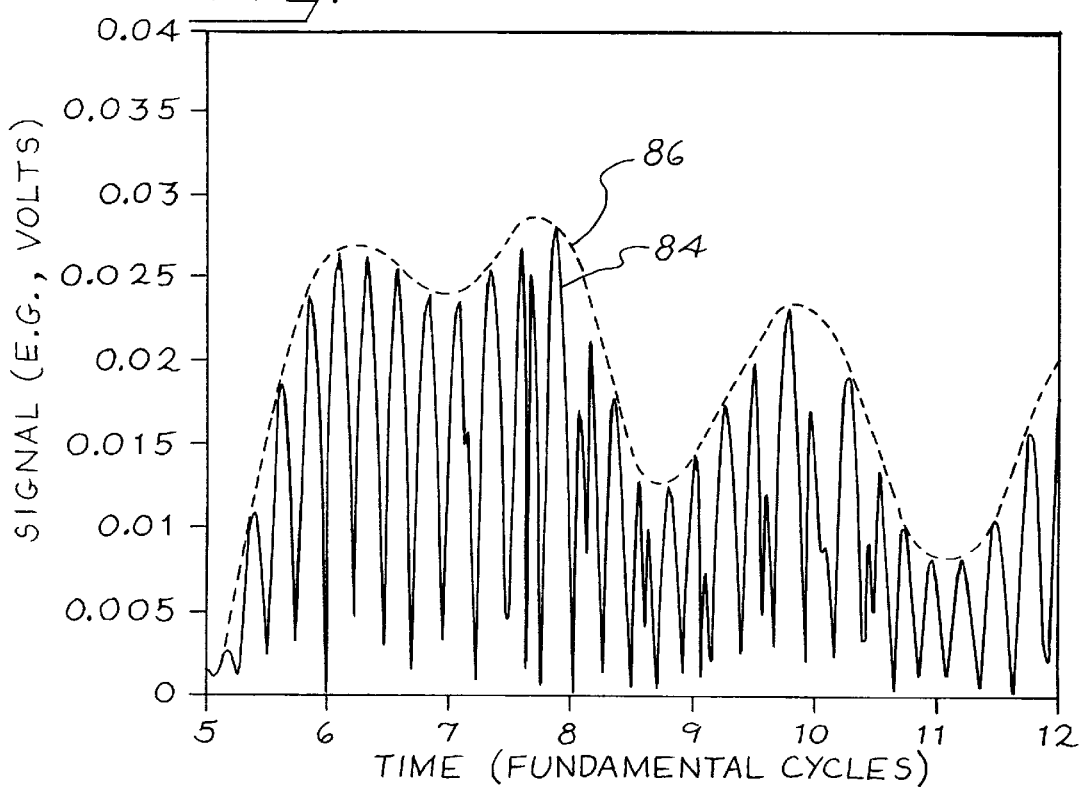

In step 54 a low-pass-filtered component of the absolute value of ZN is provided to the image processor. FIG. 7 shows one example of the absolute value of ZN (curve 84) and the low pass component or envelope 86 of this signal.

In this example, where N=1, the envelope 86 represents the actual second harmonic component of the receive signals Y1(+), Y2(−).

The imaging modes described above are of interest because they very simply perform a number of image processing tasks without having to use the usual processing power necessary to perform these tasks. Among the tasks that are automatically performed are the rejection of the fundamental signal and the compounding of the fundamental and harmonic signals in the receive signals. What's more, these tasks are performed even when the bandwidths are large enough that substantial overlap exists between the fundamental and harmonic image bands.

The basic imaging technique described above may be used with a wide variety of system architectures. The data associated with the two component frames may be RF data, IF data, or analytic baseband data. In the case of RF data, the system may be one that leaves the image information at RF through the beam sum, or may be one that mixes down to IF or baseband for the beam sum but then mixes back up to RF (or IF) for the combination of the sub-frames. Regardless of how the data is treated prior to the calculation of ZN, the data at the calculation level may be real or complex, and be mixed or modulated to occupy any frequency band. In the case of a system architecture such as the architecture described in U.S. Pat. Nos. 5,685,308 and 5,667,373, assigned to the assignee of the present invention, the data may be that which results directly from beam formation, or may be that which was analytically interpolated from such data, or may be phase and amplitude corrected versions of such data.

In the simplest case for analysis, the image data is real RF data. In that case, the image that results from the low pass filtering of |Z1| may be shown to be the second harmonic image, and the image that results from the low pass filtering of |Z2| is the product of the fundamental image and the second harmonic image. When log compressed, this image is the sum of the log compressed fundamental image and the log compressed second harmonic image. In other words, it is a frequency compounded image where the component frames are the fundamental and the second harmonic frames. The higher order images (Z3, Z4, etc . . . ) are more complicated combinations of the fundamental and second harmonic images.

Somewhat more complicated possibilities exist when the data to be operated upon is complex, as in the case of a system such as that of U.S. Pat. No. 5,667,373, for which the line data is analytic (i.e., complex) baseband data. In such a case, ZN may be calculated directly as $$ZN=|y1|^N-|y2|^N,$$

as outlined above, or ZN may be calculated for the real and imaginary components of the constituent frames separately:

$$Z_N^{Real}=|\text{Real }(y1)|^N-|\text{Real }(y2)|^N,$$

$$Z_N^{Im}=|\text{Imag }(y1)|^N-|\text{Imag }(y2)|^N$$

The resultant $Z_N^{Real}$ and $Z_N^{Im}$ may then be combined, such as by calculating the sum of the magnitudes $ZN=|Z_N^{Real}|+|Z_N^{Im}|$. Such a definition of ZN yields the second harmonic image in the N=1 case and the compound fundamental and second harmonic image in the N=2 case, just as was found to be the case for the simpler definition of ZN considered earlier. The advantage of this more complicated definition lies in the high frequency structure of the image. The high frequency structure in the more complicated definition is more easily filtered to yield the image of interest (i.e., the harmonic image or the compound image).

Of course, many modifications and changes can be made to the preferred embodiments described above. For example, the transmitter and the receiver can be either analog or digital systems. The transmitter can provide transmit signals that are either modulated in amplitude or simple two-state signals. The transmitter and the receiver can be single beam or multiple beam devices.

The phase difference between the first and second transmit beams should be chosen to be effective to achieve destructive cancellation as described above but is not always required to be precisely 180°. The transmit lines associated with the combined received lines may either be aligned as disclosed in Chapman U.S. Pat. No. 5,632,277 or spaced from one another as described in pending U.S. patent application Ser. No. 08/993,395 (filed Dec. 18, 1997) Abnd and 08/993,533, filed Dec. 18, 1997 ABND, both assigned to the assignee of the present invention. The desired phase difference between the first and second transmit beams may be obtained using any suitable approach, including phase shift, time delay, and alternate waveform techniques.

The transducer can take any suitable form, including 1,1.5 and 2 dimensional transducers of either conventional planar or plano-concave shape for example. The signal combiner 24, the logic blocks 18, 20, 26, and the filter 28 can be implemented as analog or digital circuits. The memory 22 can be a sample memory, a line memory, or a frame memory as appropriate for the application. The absolute value logic block 18 can be placed anywhere in the receive processing path upstream of the summer 24, as can the logic block 20 that takes the Nth power. In the event the system operates only with N=1, the logic block 20 can be deleted.

As used herein, the term "region" is intended broadly to encompass a neighborhood of a subject. The term "ultrasound receive signals" is intended broadly to encompass RF, IF, and baseband signals. The term "memory" is intended broadly to encompass analog and digital memories for samples, lines or frames.

The foregoing detailed description has described only a few of the many forms that this invention can take. For this reason it is intended that this description be regarded as an illustration of selected embodiments and not as a definition of the invention. It is only the following claims, including all equivalents, that are intended to define the scope of this invention.

What is claimed is:

1. A diagnostic medical ultrasonic imaging method comprising:

(a) forming a first signal as a function of the Nth power of the absolute value of a first ultrasound receive signal;

(b) forming a second signal as a function of the Nth power of the absolute value of a second ultrasound receive signal, said first and second receive signals associated with respective first and second transmit pulses that differ in phase; and (c) forming a third signal as a function of the difference between the first and second signals.

2. The method of claim 1 wherein the Nth power of (a) is the first power.

3. The method of claim 2 wherein the first and second signals comprise respective fundamental frequency components, and wherein the third signal formed in (c) has a reduced fundamental frequency component as compared with the first and second signals.

4. The method of claim 2 wherein the third signal comprises a combination of fundamental and harmonic components of the first and second signals.

5. The method of claim 1 wherein the Nth power of (a) is the second power.

6. The method of claim 1 wherein the first and second transmit pulses are characterized by a common center transmit frequency, and wherein the first and second transmit pulses differ in phase by about one-half cycle of the center transmit frequency.

7. The method of claim 1 wherein the first and second ultrasound receive signals are RF signals.

8. The method of claim 1 wherein the first and second ultrasound receive signals are IF signals.

9. The method of claim 1 wherein the first and second ultrasound receive signals are baseband signals.

10. The method of claim 1 wherein the first and second ultrasound receive signals are substantially similar in frequency range.

11. The method of claim 1 wherein the third signal formed in (c) comprises a combination of fundamental and harmonic components of the first and second signals.

12. A diagnostic medical ultrasound imaging system receive signal path comprising:
a memory operative to store a signal that varies as a function of a first receive signal;
a receive signal combiner coupled with the memory and operative to form a difference between the Nth power of the absolute value of the first receive signal and the Nth power of the absolute value of a second receive signal.

13. The invention of claim 12 wherein the Nth power is the first power.

14. The invention of claim 13 wherein the first and second signals comprise respective fundamental frequency components, and wherein the difference has a reduced fundamental frequency component as compared with the first and second signals.

15. The invention of claim 12 wherein the Nth power is the second power.

16. The invention of claim 12 wherein the first and second ultrasound receive signals are substantially similar in frequency range.

17. The invention of claim 12 wherein the difference comprises a combination of fundamental and harmonic components of the first and second signals.

18. A diagnostic medical ultrasound imaging system comprising:
means for forming a first signal as a function of the Nth power of the absolute value of a first ultrasound receive signal;
means for forming a second signal as a function of the Nth power of the absolute value of a second ultrasound receive signal, said first and second receive signals associated with respective first and second transmit pulses that differ in phase; and
means for forming a third signal as a function of the difference between the first and second signals.

19. The invention of claim 18 wherein the Nth power is the first power.

20. The method of claim 19 wherein the first and second signals comprise respective fundamental frequency components, and wherein the third signal has a reduced fundamental frequency component as compared with the first and second signals.

21. The invention of claim 18 wherein the Nth power is the second power.

22. The invention of claim 18 wherein the first and second transmit pulses are characterized by a common center transmit frequency, and wherein the first and second transmit pulses differ in phase by about one-half cycle of the center transmit frequency.

23. The invention of claim 18 wherein the first and second ultrasound receive signals are RF signals.

24. The invention of claim 18 wherein the first and second ultrasound receive signals are IF signals.

25. The invention of claim 18 wherein the first and second ultrasound receive signals are baseband signals.

26. The invention of claim 18 wherein the first and second ultrasound receive signals are substantially similar in frequency range.

* * * * *

UNITED STATES PATENT AND TRADEMARK OFFICE
CERTIFICATE OF CORRECTION

PATENT NO. : 6,120,448
DATED : September 19, 2000
INVENTOR(S) : Charles E. Bradley et al.

It is certified that error appears in the above-identified patent and that said Letters Patent is hereby corrected as shown below:

In column 3, line 61, delete "$Z_N^{lm}$" and substitute -- $|Z_N^{lm}|$ -- in its place.

Signed and Sealed this

Twenty-ninth Day of May, 2001

Attest:

NICHOLAS P. GODICI

Attesting Officer *Acting Director of the United States Patent and Trademark Office*